UNITED STATES PATENT OFFICE.

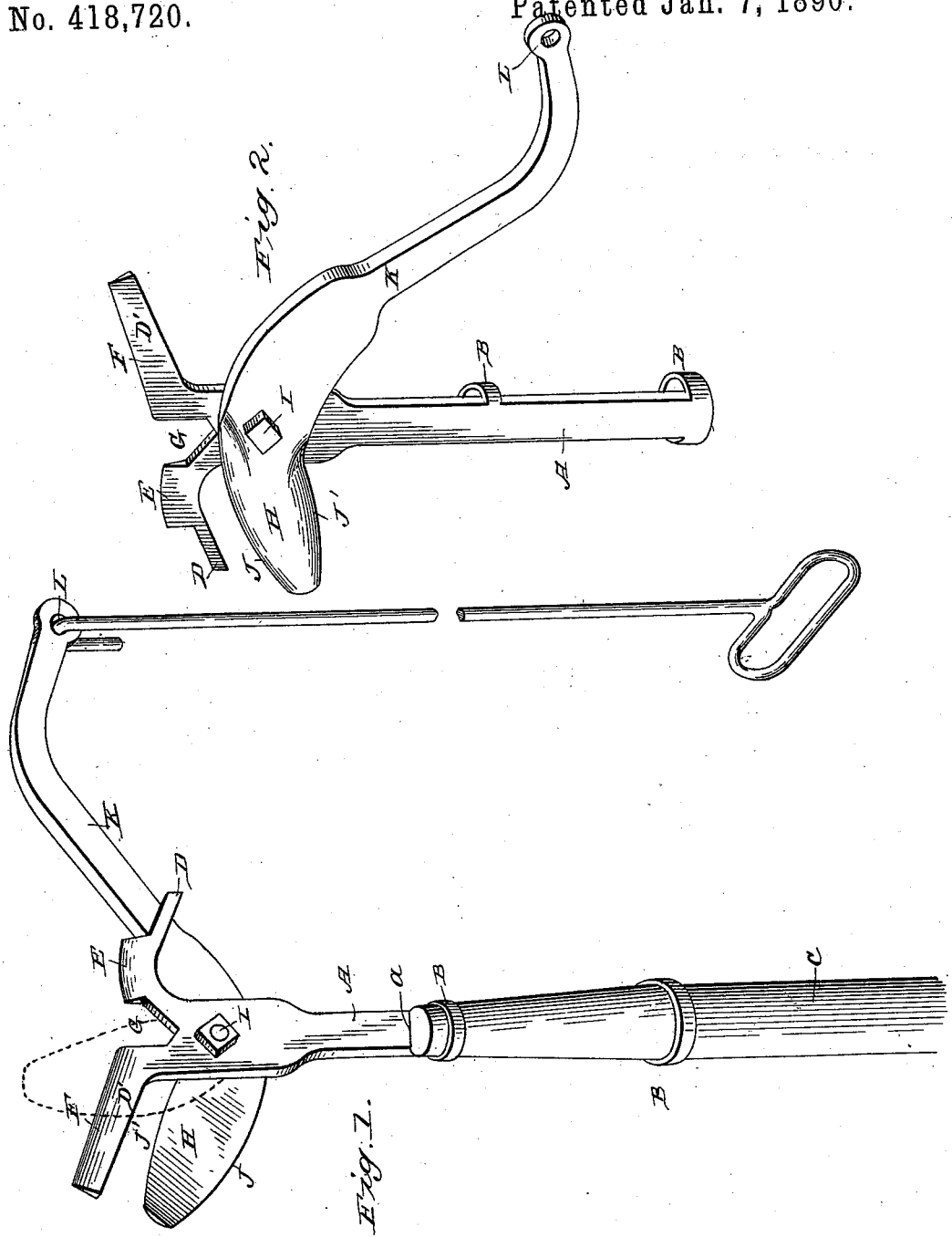

PAULUS HESS, OF IVEYVILLE, IOWA.

PRUNING IMPLEMENT.

SPECIFICATION forming part of Letters Patent No. 418,720, dated January 7, 1890.

Application filed August 14, 1889. Serial No. 320,720. (No model.)

*To all whom it may concern:*

Be it known that I, PAULUS HESS, a citizen of the United States, residing at Iveyville, in the county of Taylor and State of Iowa, have invented certain new and useful Improvements in Pruning Implements; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to pruning and trimming implements for horticultural use, and has for its object to provide such an implement having three points of cut for the pivoted blade, and in addition two other cutting-edges, one being a chisel and the other a knife-cutting edge, as hereinafter more particularly described; and to the accomplishment of the above ends the invention consists in the construction and combination of parts hereinafter fully described and claimed, reference being had to the accompanying drawings, forming a part hereof.

Figure 1 is a perspective of the device. Fig. 2 is a perspective of the pruning implement with the pole detached, looking from the opposite side of Fig. 1.

In the drawings, the letter A designates the main arm or shank of the implement formed with the two eyes or loops B, through which the handle or pole C will pass and be secured to the main arm. The handle or pole will have one flat side $a$ to lie against the flat face of the arm, so as to prevent it from turning, and will taper at the portion that enters the loops, so as to fit snugly into the loops, which are of different diameters, as shown, the lower one being the largest. By such construction the handle or pole can be readily slipped into and out of place for the ready substitution of another one and yet be securely held to its place without other fastening means. The upper end of the main arm is formed with an extension or hook D, on top of which is formed a blade E, constituting a chisel cutting-edge, and also with a second arm or extension D', extending in the opposite direction and constituting a knife F, having an appropriate cutting-edge. This knife-blade preferably stands at an oblique angle to a perpendicular, so as to present its upper cutting-edge in the best position for use as a trimming or pruning knife, and at the same time having its lower edge or back stand in such position that a sprig or twig will be held between it and the pivoted shearing-jaw when the latter is moved to cut the twig.

Between the two arms or extensions constituting the hook and the knife is a space G, forming a fork to receive a twig, which, as the shearing-jaw is moved, will be forced against the shoulder or stop formed by one side of the chisel-blade, so that the shearing-jaw can cut it.

The shearing-jaw is designated by the letter H, and is pivoted by a bolt I to the main arm A, so as to swing back and forth. It is formed with the two cutting-edges J and J'—one on each side—so that it may shear in moving in both directions back and forth. One face is flat and the other preferably convex, as shown. It is formed with an arm or extension K, preferably curved, as shown, and formed with an eye L at its end for the attachment of a hook, which is grasped by the operator in manipulating the implement.

Under the construction described the implement is formed with three shearing cuts obtained in the movement of the jaw; also, with the chisel-edge for the uses in which it is desirable to employ such a cut; and, further, a pruning-knife-blade edge. To illustrate, one cut is between the hook and the jaw, as shown in Fig. 2, another is between the jaw and the back of the knife-blade, as shown in Fig. 1, which is made by reversing the implement so as to bring the jaw beneath the main arm. The third is between the jaw and the side of the chisel, as shown by dotted lines in Fig. 1. The foregoing are the shearing cuts. The other two are the chisel and knife cutting-edges, which need no additional description.

The implement as described has an increased number of cutting-edges, and is adapted to the use made of such various cutting-edges in the art of horticulture, and all are combined in one implement.

It is obvious that there may be changes made in the details and arrangement of parts without departing from the spirit of my invention.

Having described my invention and set forth its merits, what I claim is—

1. The pruning implement having the hook-arm D extending in one direction and the arm J extending in the opposite direction, and having the knife-edge F formed on its upper side, in combination with the pivoted jaw H, sharpened on opposite edges and adapted to cut in one direction against said hook and in the other direction against the back of the knife, substantially as and for the purposes set forth.

2. The pruning implement having its main arm formed with a hook D, a fork G, and a chisel cutting-edge E between said fork and hook, in combination with the pivoted jaw constructed to cut against said hook and the side of the chisel, substantially as and for the purposes set forth.

3. The pruning implement having the main arm formed with the hook D and chisel E on one extension and knife-edge F on the other extension D', in combination with the pivoted jaw H, sharpened on opposite edges, substantially as and for the purposes set forth.

In testimony whereof I affix my signature in presence of two witnesses.

PAULUS HESS.

Witnesses:
  H. V. VAN PELT,
  G. Q. LITTLE.